(12) United States Patent
Toguchi

(10) Patent No.: US 7,932,951 B2
(45) Date of Patent: Apr. 26, 2011

(54) FOCUS ADJUSTMENT DEVICE, IMAGING DEVICE AND FOCUS ADJUSTMENT METHOD

(75) Inventor: Masaaki Toguchi, Toyota (JP)

(73) Assignee: Elmo Company, Limited (JP)

( * ) Notice: Subject to any disclaimer, the term of this patent is extended or adjusted under 35 U.S.C. 154(b) by 722 days.

(21) Appl. No.: 11/939,778

(22) Filed: Nov. 14, 2007

(65) Prior Publication Data
US 2008/0165273 A1    Jul. 10, 2008

(30) Foreign Application Priority Data

Jan. 5, 2007  (JP) ................. 2007-000457

(51) Int. Cl.
*H04N 5/232*    (2006.01)

(52) U.S. Cl. ...................................... 348/356

(58) Field of Classification Search ............ 348/345, 348/354, 356; 359/696, 698, 697
See application file for complete search history.

(56) References Cited

U.S. PATENT DOCUMENTS

| | | | | |
|---|---|---|---|---|
| 4,841,370 A * | 6/1989 | Murashima et al. | .......... | 348/351 |
| 4,888,609 A * | 12/1989 | Hamada et al. | ............... | 396/104 |
| 5,430,483 A * | 7/1995 | Haruki | .......................... | 348/349 |
| 5,528,331 A * | 6/1996 | Kusaka et al. | .................. | 396/95 |
| 5,614,951 A * | 3/1997 | Lee et al. | ....................... | 348/356 |
| 7,463,302 B2 * | 12/2008 | Kobayashi | .................... | 348/345 |
| 2001/0000674 A1 * | 5/2001 | Yasuda | ......................... | 348/349 |
| 2007/0212051 A1 * | 9/2007 | Moriya | ......................... | 396/147 |

FOREIGN PATENT DOCUMENTS

| | | |
|---|---|---|
| JP | 1-125065 | 5/1989 |
| JP | 7-87377 | 3/1995 |
| JP | 8-265620 | 10/1996 |

* cited by examiner

*Primary Examiner* — Timothy J Henn
*Assistant Examiner* — Gary C Vieaux
(74) *Attorney, Agent, or Firm* — Ostrolenk Faber LLP

(57) ABSTRACT

A video camera constructed according to one aspect of the focus adjustment device moves a focus lens forward and backward and detects peak values of an AF evaluation value of the focus lens in the forward moving direction and in the backward moving direction. The video camera calculates a correction value based on a difference between the peak value of the evaluation value detected in the forward motion of the lens and the peak value of the evaluation value detected in the backward motion of the lens. The video camera corrects the AF evaluation value with the calculated correction value and detects a focused position of the lens based on the corrected AF evaluation value in moving the lens.

15 Claims, 12 Drawing Sheets

FOCUS ADJUSTMENT DEVICE, IMAGING DEVICE AND FOCUS ADJUSTMENT METHOD

CLAIM OF PRIORITY

The present application claims the priority based on Japanese Patent Application No. 2007-000457 filed on Jan. 5, 2007, the disclosure of which is hereby incorporated by reference in its entirety.

BACKGROUND

1. Technical Field

The present invention relates to a technology for automatically adjusting the focus of a lens.

2. Related Art

Latest still cameras and video cameras generally have the auto focusing function. One proposed technology of auto focusing control moves a focus lens in a lens unit to maximize an evaluation value calculated from a high frequency component of a luminance value of a captured image as shown in FIG. 12 (see, for example, Japanese Patent Laid-Open No. H07-87377 and No. H01-125065).

A moving mechanism of moving the lens in the lens unit generally has a stepping motor equipped with a lead screw, a lens frame for supporting the lens, and a guide bar for guiding the motion of the lens frame in the direction of an optical axis. The lens frame has a rack for transmitting the power of the motor to the lens frame. The rack is joined with the lead screw of the motor. The motor is driven to rotate the lead screw. The rack converts the rotational force of the lead screw to the moving force of the lens frame in the direction of the optical axis.

In the lens unit, a backlash of the joint between the lead screw and the lens frame may lead to a variation in moving distance of the lens according to the moving direction of the lens. One proposed technology against this problem disclosed in Japanese Patent Laid-Open No. H08-265620 adds an additional moving distance to the moving distance of the lens on the occasion of inverting the moving direction of the lens, so as to compensate for the variation in moving distance.

On the occasion of inverting the moving direction of the lens, however, there may be a positional deviation of the optical axis of the lens from its center axis or a change in inclination of the lens, in addition to the variation in moving distance of the lens. The proposed technology of the above cited reference has difficulty in dealing with such a potential positional deviation of the optical axis and a potential inclination change of the lens.

SUMMARY

By taking the problem accompanied with the mechanical backlash in the lens unit into consideration, there is a demand of enabling highly accurate auto focusing of a lens.

According to one aspect, the invention is directed to a focus adjustment device that moves a lens in a direction of an optical axis to adjust a focus of the lens. The focus adjustment device comprises: an evaluation unit configured to analyze an image captured via the lens and specify an evaluation value representing a focused state of the lens; a correction value calculation unit configured to capture an image of a specific subject with moving the lens forward and backward, and calculate an evaluation correction value for correcting the evaluation value, based on a difference between a peak value of the evaluation value detected in a forward motion of the lens and a peak value of the evaluation value detected in a backward motion of the lens, prior to moving the lens for adjustment of the focus; a focused position detection unit configured to correct the evaluation value with the calculated evaluation correction value according to a moving direction of the lens, and detect a focused position of the lens, based on the corrected evaluation value in moving the lens for adjustment of the focus; and a focusing control unit configured to move the lens to the detected focused position.

The focus adjustment device according to this aspect of the invention calculates the evaluation correction value from the peak value of the evaluation value that varies according to the moving direction of the lens, and detects the focused position of the lens based on the calculated evaluation correction value. Even when the optical axis of the lens is deviated from its center axis according to the moving direction of the lens or when an inclination of the lens is changed, this arrangement enables the lens to be accurately focused on the specific subject with correction of the evaluation value. The evaluation value specified by the evaluator may be based on, for example, a high frequency component of a luminance value or of RGB values of the image captured via the lens.

The technique of the invention is not restricted to the focus adjustment device described above but may be actualized by diversity of other applications, for example, an imaging device equipped with such a focus adjustment device, for example, a still camera or a video camera, as well as a corresponding focus adjustment method adopted.

These and other objects, features, aspects, and advantages of the invention will become more apparent from the following detailed description of the preferred embodiments with the accompanying drawings.

DESCRIPTION OF THE PREFERRED EMBODIMENT

Figure 1:
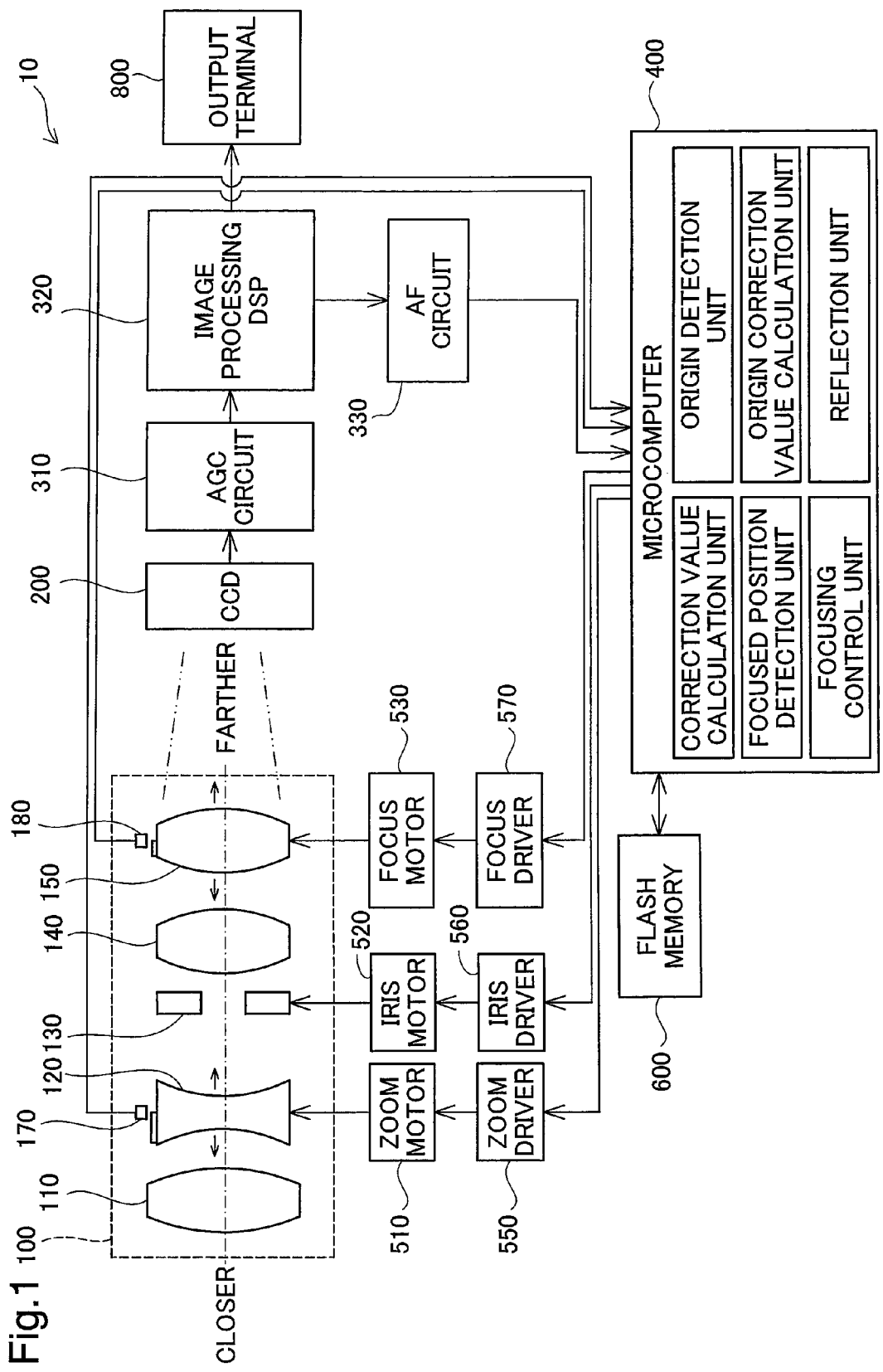
FIG. 1 shows the schematic structure of a video camera in one embodiment of the invention.

Some modes of carrying out the invention are described below in the following sequence with reference to the accompanied drawings:

A. Structure of Video Camera
B. Correction Value Calculation Process for Factory Setting
C. Power-On Initialization Process
D. Auto Focusing Process
(D-1) Hill-Climbing Process
(D-2) Predictive Focus Value Estimation Process
(D-3) Focus Value Comparison Process
E. Other Aspects A. Structure of Video Camera FIG. 1 shows the schematic structure of a video camera 10 in one embodiment of the invention. As illustrated, the video camera 10 of the embodiment includes a lens unit 100, a CCD 200, an AGC circuit 310, an image processing DSP (digital signal processor) 320, an AF circuit 330, a microcomputer 400, and a flash memory 600.

The lens unit 100 includes a first lens 110, a zoom lens 120, an iris mechanism 130, a third lens 140, and a focus lens 150, which are provided in this sequence from the subject closer side. The first lens 110 and the third lens 140 are fastened to be stationary in the lens unit 100. The zoom lens 120 is moved in the direction of an optical axis to vary the magnification. The iris mechanism 130 adjusts the quantity of light transmitted through the lens unit 100. The focus lens 150 is moved in the direction of the optical axis to adjust the focused position. In the description below, the direction of approaching to and focusing a subject is referred to as 'closer direction', whereas the direction of receding from the subject to infinity is referred to as 'farther direction'. In the lens unit 100 of the embodiment, the moving direction of the focus lens 150 toward the subject is the 'closer direction', and the moving direction of the focus lens 150 toward the CCD 200 is the 'farther direction' as shown in FIG. 1. In the lens unit of an inner focus type, the zoom lens and the focus lens may also be called 'variator lens' and 'compensator lens', respectively.

The zoom lens 120 is connected with a zoom motor 510 having a lead screw to move the zoom lens 120 back and forth in the direction of the optical axis. The zoom motor 510 is a stepping motor and is connected to the microcomputer 400 via a zoom driver 550 for driving the zoom motor 510. The zoom lens 120 is moved in the direction of the optical axis in the lens unit 100 to vary the magnification corresponding to the number of steps specified by the microcomputer 400.

The focus lens 150 is connected with a focus motor 530 having a lead screw to move the focus lens 150 back and forth in the direction of the optical axis. The focus motor 530 is a stepping motor and is connected to the microcomputer 400 via a focus driver 570 for driving the focus motor 530. The focus lens 150 is moved in the direction of the optical axis in the lens unit 100 to adjust the focused position corresponding to the number of steps specified by the microcomputer 400.

The iris mechanism 130 is connected with an iris motor 520 to adjust the aperture of the iris mechanism 130. The iris motor 520 is a galvanometer and is connected to the microcomputer 400 via an iris driver 560 for driving the iris motor 520. The iris mechanism 130 adjusts the quantity of light transmitted through the lens unit 100 in response to an instruction from the microcomputer 400. In the structure of this embodiment, the stepping motors are applied to the zoom motor 510 and the focus motor 530, and the galvanometer is applied to the iris motor 520. These are, however, not restrictive, but other type of motors, for example, dc motors, may be applied to the zoom motor 510, the focus motor 530, and the iris motor 520.

As mentioned previously, the zoom lens 120 and the focus lens 150 are moved in the direction of the optical axis in the lens unit 100. The lens unit 100 has a first origin sensor 170 and a second origin sensor 180 to detect whether the respective lenses 120 and 150 reach preset reference positions specified as their origins. The first origin sensor 170 and the second origin sensor 180 are constructed by photo interrupters and are connected to the microcomputer 400. In the structure of this embodiment, when the zoom lens 120 or the focus lens 150 passes through the corresponding origin sensor 170 or 180 from the closer direction to the farther direction, an output signal of the origin sensor 170 or 180 changes from '1' to '0'. When the lens 120 or 150 passes through the corresponding origin sensor 170 or 180 from the farther direction to the closer direction, on the other hand, the output signal of the origin sensor 170 or 180 changes from '0' to '1'. The microcomputer 400 detects these signal changes and determines whether the zoom lens 120 and the focus lens 150 have reached the respective origins.

The CCD 200 is an image sensor that receives the light transmitted through the lens unit 100 and converts the received light into an electric signal.

The AGC circuit 310 inputs the electric signal from the CCD 200 and amplifies the input electric signal to an adequate output level.

The image processing DSP 320 inputs the amplified electric signal from the AGC circuit 310 and performs A-D conversion of the input electric signal to generate image data. The image processing DSP 320 converts the generated image data into a composite video signal or an S video signal and outputs the video signal via an output terminal 800 to an external device, for example, a TV monitor or a picture recorder. The image processing DSP 320 also functions to extract a luminance signal from the image data generated by the A-D conversion and output the extracted luminance signal to the AF circuit 330. The image processing DSP 320 has diversity of other image processing functions, for example, gamma correction and aperture correction of the image data and white balance adjustment.

The AF circuit 330 has a circuit structure including a high pass filter, an absolute value circuit, a gate circuit, and a wave detector circuit. In response to input of the luminance signal from the image processing DSP 320 to the AF circuit 330, the high pass filter extracts a high frequency component from the input luminance signal, and the absolute value circuit specifies an absolute value of the extracted high frequency component. The gate circuit takes only a specific high frequency component in a preset distance range from the specified absolute value of the high frequency component. The wave detector circuit detects a wave peak of the specific high frequency component and generates an AF evaluation value. The generated AF evaluation value is output from the AF circuit 330 to the microcomputer 400. The higher AF evaluation value represents the better focus condition of the focus lens 150. The image processing DSP 320 and the AF circuit 330 of the embodiment are equivalent to the 'evaluation unit' of the invention.

The microcomputer 400 inputs the AF evaluation value from the AF circuit 330 and adjusts the focused position of the focus lens 150 corresponding to the input AF evaluation value. The microcomputer 400 is connected with the flash memory 600. Various correction values are calculated for factory setting of the video camera 10 according to a correction value calculation process described below and are recorded in the flash memory 600. The microcomputer 400 of the embodiment corresponds to the 'correction value calculation unit', the 'focused position detection unit', the 'focusing control unit', the 'origin detection unit', the 'origin correction value calculation unit', and the 'reflection unit' of the invention.

B. Correction Value Calculation Process for Factory Setting

Figure 2:
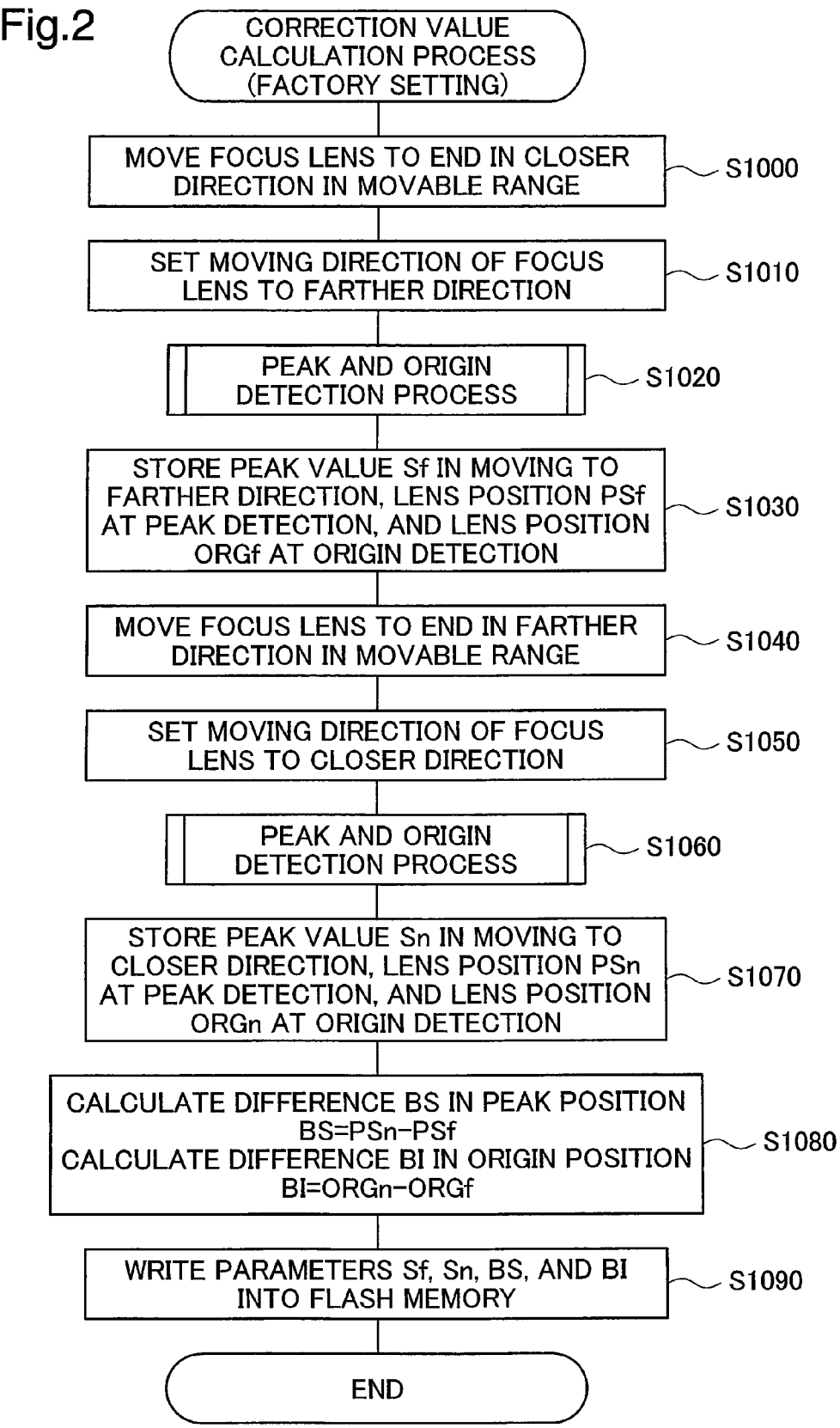
FIG. 2 is a flowchart showing a correction value calculation process executed in the video camera.

FIG. 2 is a flowchart showing a correction value calculation process executed by the microcomputer 400 in a factory inspection process before shipment of the video camera 10. This correction value calculation process is performed to compute various correction values used for a subsequent auto focusing process with respect to each individual video camera 10. This process is executed in a state of locating the video camera 10 and a predetermined subject at respective fixed positions.

On the start of the correction value calculation process, the microcomputer 400 first gives an instruction to the focus driver 570 to drive the focus motor 530 and move the focus lens 150 to one end in the closer direction in its movable range (step S1000). The microcomputer 400 then sets the moving direction of the focus lens 150 to the farther direction (step S1010). According to a concrete procedure, the microcomputer 400 provides a flag representing the moving direction of the focus lens 150. The moving direction of the focus lens 150 is set to the farther direction by setting the value '1' to the flag, while being set to the closer direction by setting the value '0' to the flag. The microcomputer 400 refers to the setting of this flag and readily identifies the moving direction of the focus lens 150 in a subsequent series of processing.

After setting the moving direction of the focus lens 150 to the farther direction, the microcomputer 400 moves the focus lens 150 in the farther direction and detects a peak of the AF evaluation value and the position of the origin of the focus lens 150 (step S1020). Such detection is performed according to a 'peak and origin detection process' described below in detail.

Figure 3:
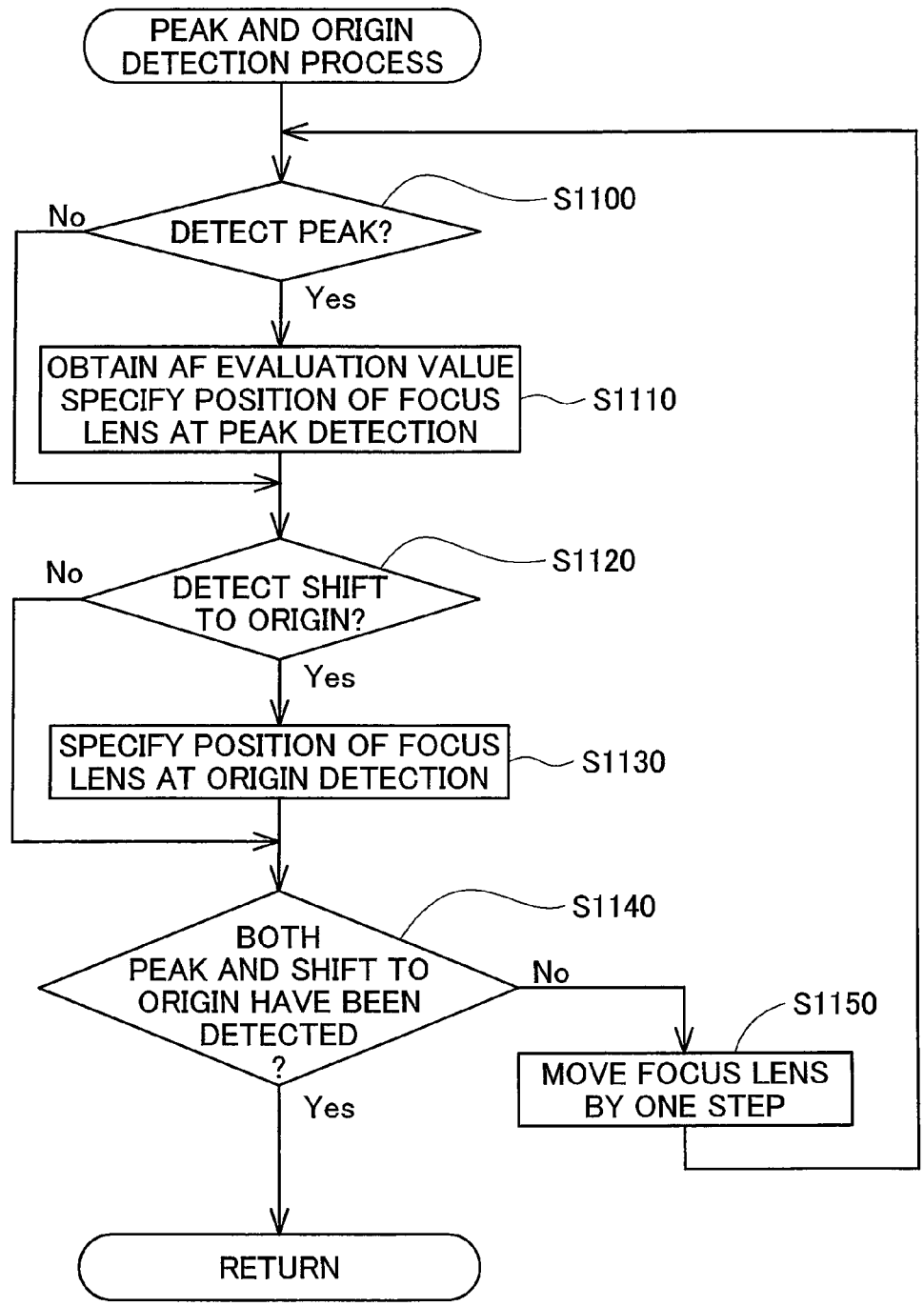
FIG. 3 is a flowchart showing the details of a peak and origin detection process.

FIG. 3 is a flowchart showing the details of the peak and origin detection process. On the start of the peak and origin detection process, the microcomputer 400 performs the known hill-climbing control (disclosed in, for example, Japanese Patent Laid-Open No. H01-125065) at the current position of the focus lens 150 and detects whether there is a peak of the AF evaluation value input from the AF circuit 330 (step S1100). In response to detection of a peak (step S1100: yes), the microcomputer 400 obtains the AF evaluation value at the position of peak detection from the AF circuit 330 and specifies the position of the focus lens 150 on the peak detection (step S1110). In the case of no detection of a peak (step S1100: no), on the other hand, the processing of step S1110 is skipped. The position of the focus lens 150 is specified according to the accumulation of the moving distance (the number of steps) instructed to the focus motor 530 by the microcomputer 400.

The microcomputer 400 subsequently controls the second origin sensor 180 to detect whether the focus lens 150 has reached its origin (step S1120). In response to detection of the shift of the focus lens 150 to the origin (step S1120: yes), the microcomputer 400 specifies the position of the focus lens 150 at this moment (step S1130). In the case of no detection of the shift of the focus lens 150 to the origin (step S1120: no), on the other hand, the processing of step S1130 is skipped.

The microcomputer 400 then determines whether both the peak of the AF evaluation value and the shift of the focus lens 150 to the origin have been detected by the above series of processing (step S1140). Upon non-detection of at least either of the peak of the AF evaluation value and the shift of the focus lens 150 to the origin (step S1140: no), the focus lens 150 is moved by one step in the current moving direction (step S1150). The processing flow is then returned to step S1100 and repeats the processing of step S1100 to step S1130 until detection of both the peak of the AF evaluation value and the shift of the focus lens 150 to the origin. Upon detection of both the peak of the AF evaluation value and the shift of the focus lens 150 to the origin (step S1140: yes), the processing flow terminates the peak and origin detection process and proceeds to step S1030 in the correction value calculation process of FIG. 2.

Referring back to the flowchart of FIG. 2, after detection of the peak of the AF evaluation value and the shift of the focus lens 150 to the origin according to the peak and origin detection process described above, the microcomputer 400 stores the respective parameters obtained by the above series of processing into an internal RAM of the microcomputer 400 (step S1030). The parameters stored here include:

(1) a peak value Sf of the AF evaluation value detected in moving the focus lens 150 from the closer direction to the farther direction;

(2) a position PSf of the focus lens 150 at the peak detection; and (3) a position ORGf of the focus lens 150 at the detection of the shift of the focus lens 150 to the origin.

The microcomputer 400 then moves the focus lens 150 to the other end in the farther direction in its movable range (step S1040) and sets the moving direction of the focus lens 150 to the closer direction (step S1050). The microcomputer 400 subsequently performs the peak and origin detection process of FIG. 3 again (step S1060) and stores the respective parameters obtained by the series of processing into the internal RAM of the microcomputer 400 (step S1070). The parameters stored here include:

(1) a peak value Sn of the AF evaluation value detected in moving the focus lens 150 from the farther direction to the closer direction;

(2) a position PSn of the focus lens 150 at the peak detection; and (3) a position ORGn of the focus lens 150 at the detection of the shift of the focus lens 150 to the origin.

After storage of the parameters including the AF evaluation value and the respective positions of the focus lens 150 obtained in moving the focus lens 150 from the closer direction to the farther direction and in moving the focus lens 150 from the farther direction to the closer direction, the microcomputer 400 calculates a difference BS in peak position of the AF evaluation value and a difference BI in position of the origin caused by inversion of the moving direction of the focus lens 150 from these parameters according to Equations (1) and (2) given below (step S1080):

$$BS = PSn - PSf \tag{1}$$

$$BI = ORGn - ORGf \tag{2}$$

The microcomputer 400 writes the calculated position differences BS and BI, the peak value Sf of the AF evaluation value in moving the focus lens 150 in the farther direction, and the peak value Sn of the AF evaluation value in moving the focus lens 150 in the closer direction as correction values into the flash memory 600 (step S1090) and terminates the correction value calculation process of FIG. 2.

Figure 4:
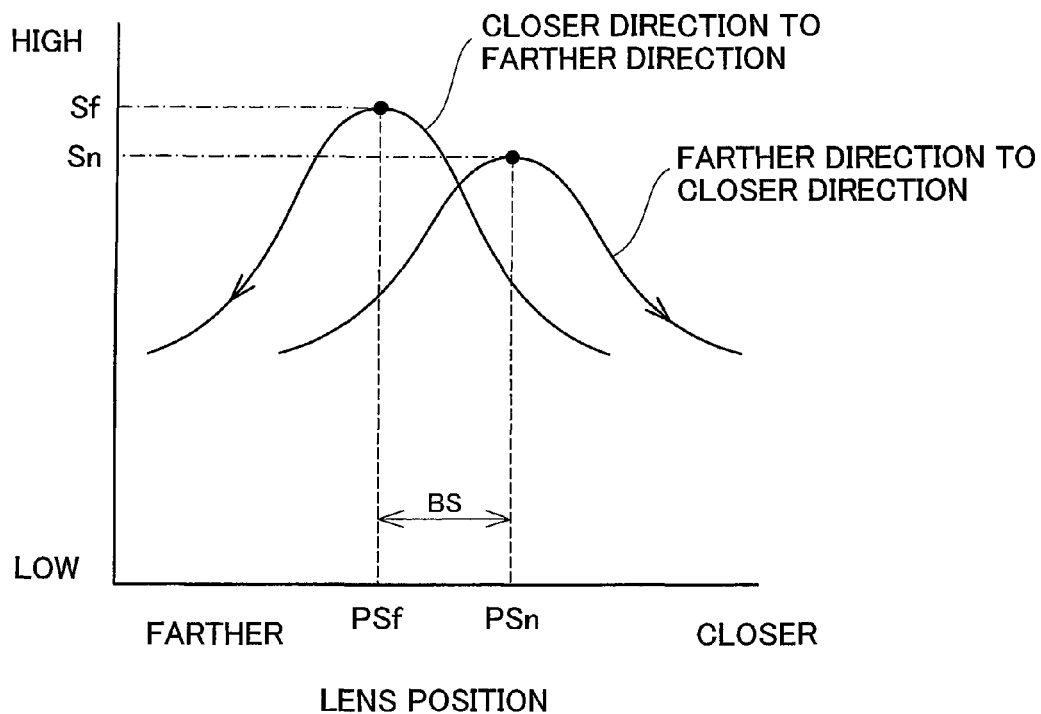
FIG. 4 shows a difference in peak position of an AF evaluation value and a difference in peak value of the AF evaluation value.

FIG. 4 shows a difference in peak position of the AF evaluation value and a difference in peak value of the AF evaluation value. The graph of FIG. 4 shows the position of the focus lens 150 as the abscissa and the AF evaluation value as the ordinate. As illustrated, there may be a slight difference between the lens position PSf at the peak of the AF evaluation value detected in moving the focus lens 150 from the farther direction to the closer direction and the lens position PSn at the peak of the AF evaluation value detected in moving the focus lens 150 from the closer direction to the farther direction. Such a difference of the lens position may be caused by a backlash of the moving mechanism of the focus lens 150. The focus lens 150 may have the optical axis deviated from its center axis or may have an inclination according to the moving direction of the focus lens 150. This leads to a difference between the peak values Sf and Sn of the AF evaluation value. The variations of these parameters are intrinsic to each individual video camera 10. The correction value calculation process accordingly records the parameters intrinsic to each individual video camera 10 as correction values into the flash memory 600 for factory setting. A subsequent auto focusing process refers to the recorded correction values to accurately adjust the focused position as described later.

C. Power-On Initialization Process

Figure 5:
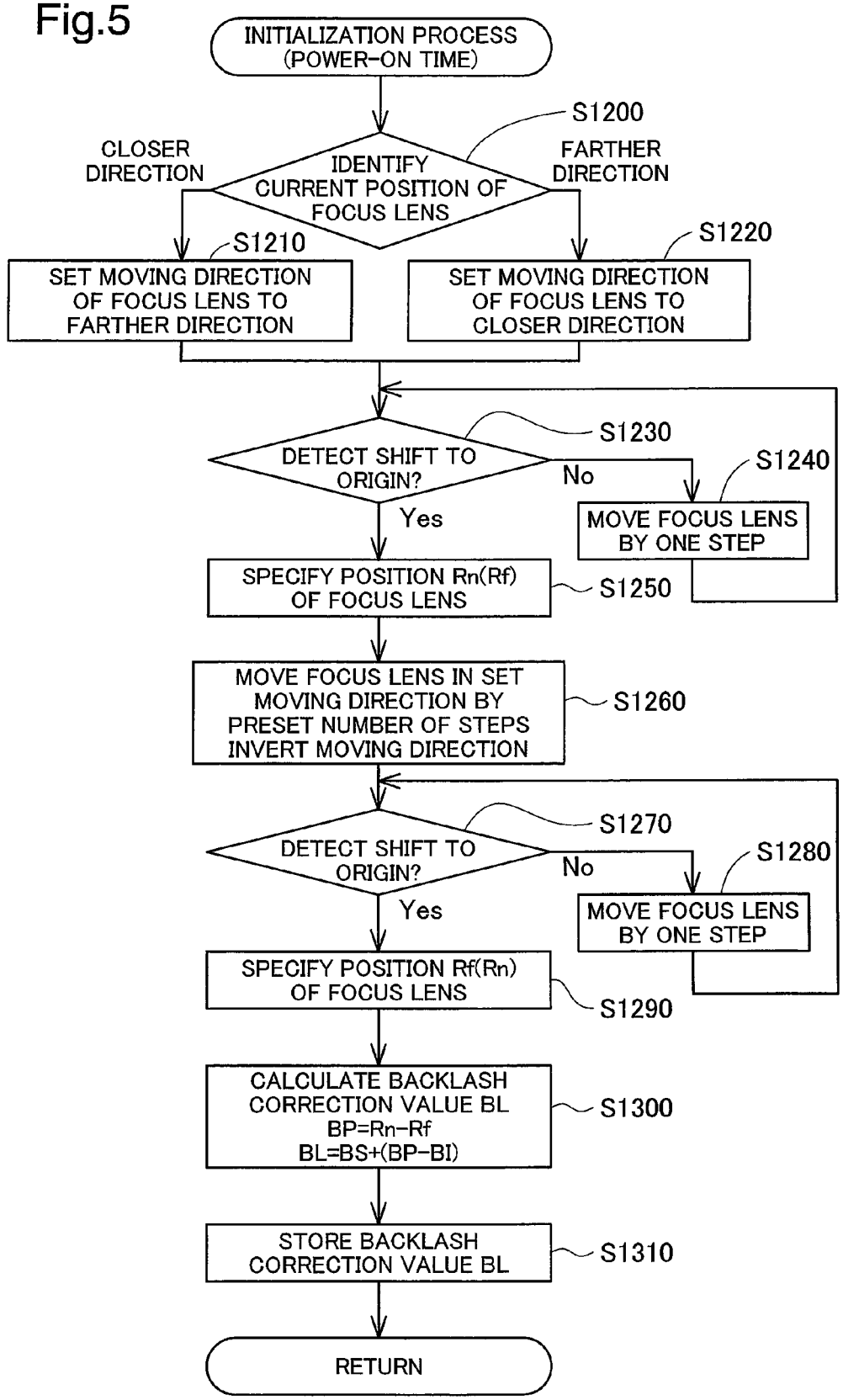
FIG. 5 is a flowchart showing an initialization process executed in the video camera.

FIG. 5 is a flowchart showing an initialization process executed by the microcomputer 400 on the user's every power-on operation of the video camera 10 after shipment.

On the start of the initialization process, the microcomputer 400 specifies the current position of the focus lens 150 and determines whether the specified current position of the focus lens 150 is located in the farther direction or in the closer direction relative to the origin (step S1200). As mentioned previously, the second origin sensor 180 takes only one of the two values '1' and '0'. The focus lens 150 is thus definitely determined to be located either in the farther direction or in the closer direction.

Upon determination at step S1200 that the current position of the focus lens 150 is located in the closer direction relative to the origin, the microcomputer 400 sets the moving direction of the focus lens 150 to the farther direction (step S1210). Upon determination at step S1200 that the current position of the focus lens 150 is located in the farther direction relative to the origin, on the contrary, the microcomputer 400 sets the moving direction of the focus lens 150 to the closer direction (step S1220).

The microcomputer 400 subsequently controls the second origin sensor 180 to detect whether the focus lens 150 has reached the position of the origin (step S1230). Upon non-detection of the shift of the focus lens 150 to the origin (step S1230: no), the microcomputer 400 moves the focus lens 150 by one step in the moving direction set either at step S1210 or at step S1220 (step S1240). The processing flow then returns to step S1230 to make detection again for the shift of the focus lens 150 to the origin.

Upon detection of the shift of the focus lens 150 to the origin (step S1230: yes), the microcomputer 400 specifies a position Rn or Rf of the focus lens 150 at this moment (step S1250). The focus lens 150 is then moved by a preset number of steps in the current moving direction, and the moving direction of the focus lens 150 is inverted (step S1260). The position of the focus lens 150 specified at step S1250 is expressed as the 'position Rn' in the case of detection of the shift to the origin in moving the focus lens 150 in the closer direction and is expressed as the 'position Rf' in the case of detection of the shift to the origin in moving the focus lens 150 in the farther direction.

The microcomputer 400 detects again whether the focus lens 150 has reached the position of the origin (step S1270). Upon non-detection of the shift of the focus lens 150 to the origin (step S1270: no), the microcomputer 400 moves the focus lens 150 by one step in the moving direction inverted at step S1260 (step S1280). The processing flow then returns to step S1270 to make detection again for the shift of the focus lens 150 to the origin.

Upon detection of the shift of the focus lens 150 to the origin (step S1270: yes), the microcomputer 400 specifies the position Rf or Rn of the focus lens 150 at this moment (step S1290). The microcomputer 400 subsequently reads the parameters BS and BI written in the flash memory 600 by the correction value calculation process executed for factory setting, and calculates a backlash correction value BL for correcting a positional misalignment of the focus lens 150, which is caused by inversion of the moving direction, from these parameters BS and BI and the specified positions Rf and Rn according to Equations (3) and (4) given below (step S1300):

$$BP=Rn-Rf \quad (3)$$

$$BL=BS+(BP-BI) \quad (4)$$

The microcomputer 400 stores the calculated backlash correction value BL into the internal RAM of the microcomputer 400 (step S1310) and terminates the initialization process.

Equation (3) gives a positional deviation BP of the origin of the focus lens 150 at the power-on time of the video camera 10. The result of subtraction of the difference BI in position of the origin detected for factory setting from the calculated positional deviation BP represents an amount of change in position of the origin by aging. Addition of the amount of change by aging to the difference BS in peak position of the AF evaluation value detected for factory setting gives the backlash correction value BL, which is suitable for the current state of the lens unit 100.

D. Auto Focusing Process

Figure 6:
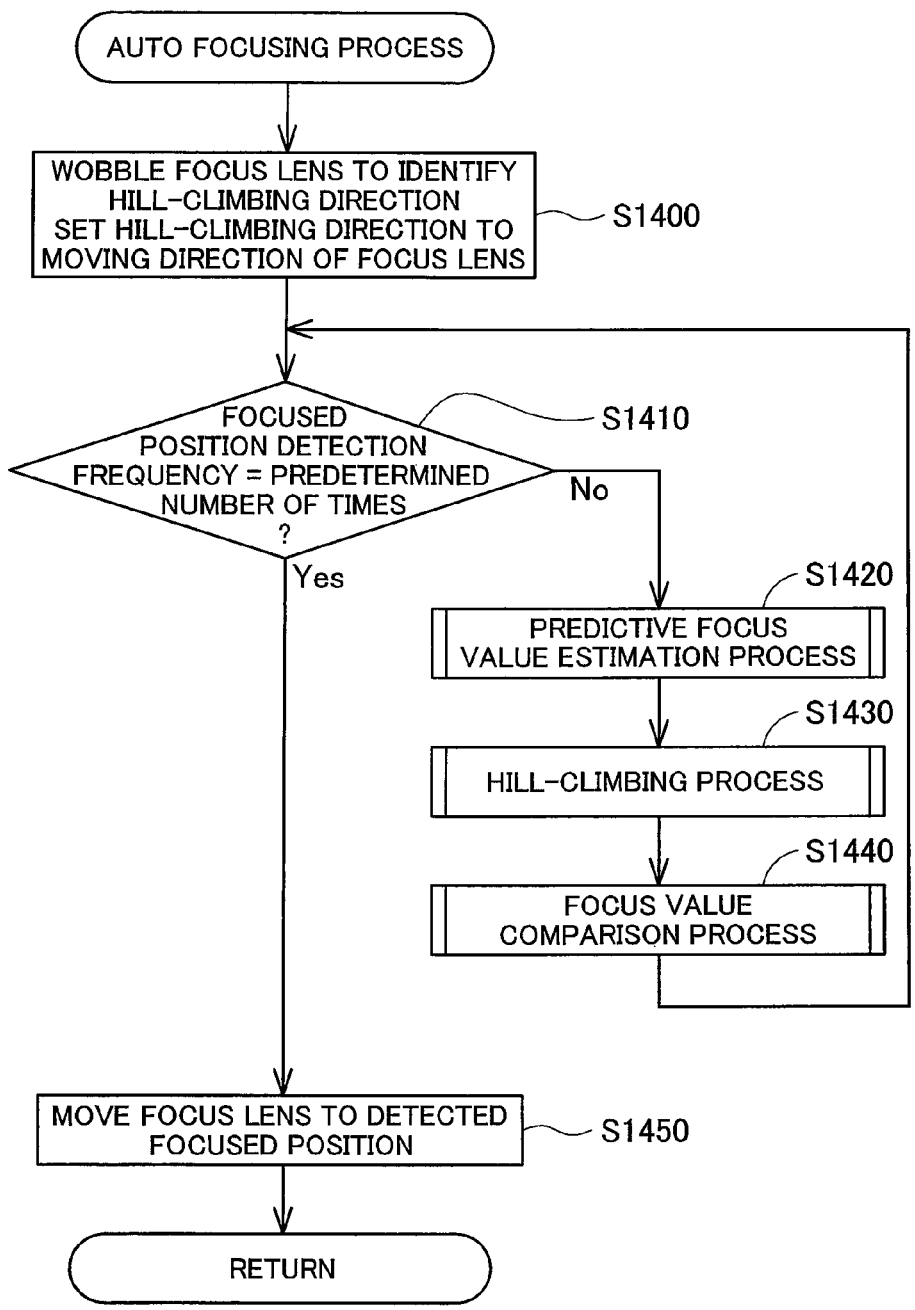
FIG. 6 is a flowchart showing an auto focusing process executed in the video camera.

FIG. 6 is a flowchart showing an auto focusing process executed by the microcomputer 400 in the course of capturing an image of a subject after completion of the initialization process explained above.

On the start of the auto focusing process, the microcomputer 400 wobbles the focus lens 150 to identify the hill-climbing direction of the AF evaluation value and sets the identified hill-climbing direction to the moving direction of the focus lens 150 (step S1400). The action of wobbling the focus lens 150 minutely oscillates the focus lens 150 at a fixed amplitude between the closer direction and the farther direction. The hill-climbing direction or the increasing direction of the AF evaluation value is identified, based on a variation in AF evaluation value caused by wobbling the focus lens 150.

The microcomputer 400 then determines whether a detection frequency of 'focused position' (hereafter referred to as 'focused position detection frequency') in the processing of steps S1420 to S1440 (described later) has reached a predetermined number of times, for example, 5 times (step S1410). When the focused position detection frequency has not yet reached the predetermined number of times (step S1410: no), the focused state is expected to be unstable. The microcomputer 400 successively performs a predictive focus value estimation process (step S1420), a hill-climbing process (step S1430), and a focus value comparison process (step S1440). The processing flow then returns to step S1410 to determine again whether the focused position detection frequency has reached the predetermined number of times. When the focused position detection frequency has reached the predetermined number of times (step S1410: yes), the focused state is expected to be stable. The microcomputer 400 accordingly moves the focus lens 150 to the detected focused position (step S1450) and terminates the auto focusing process.

For the convenience of explanation, the hill-climbing process of step S1430 is described, prior to the predictive focus value estimation process of step S1420.

(D-1) Hill-Climbing Process

Figure 7:
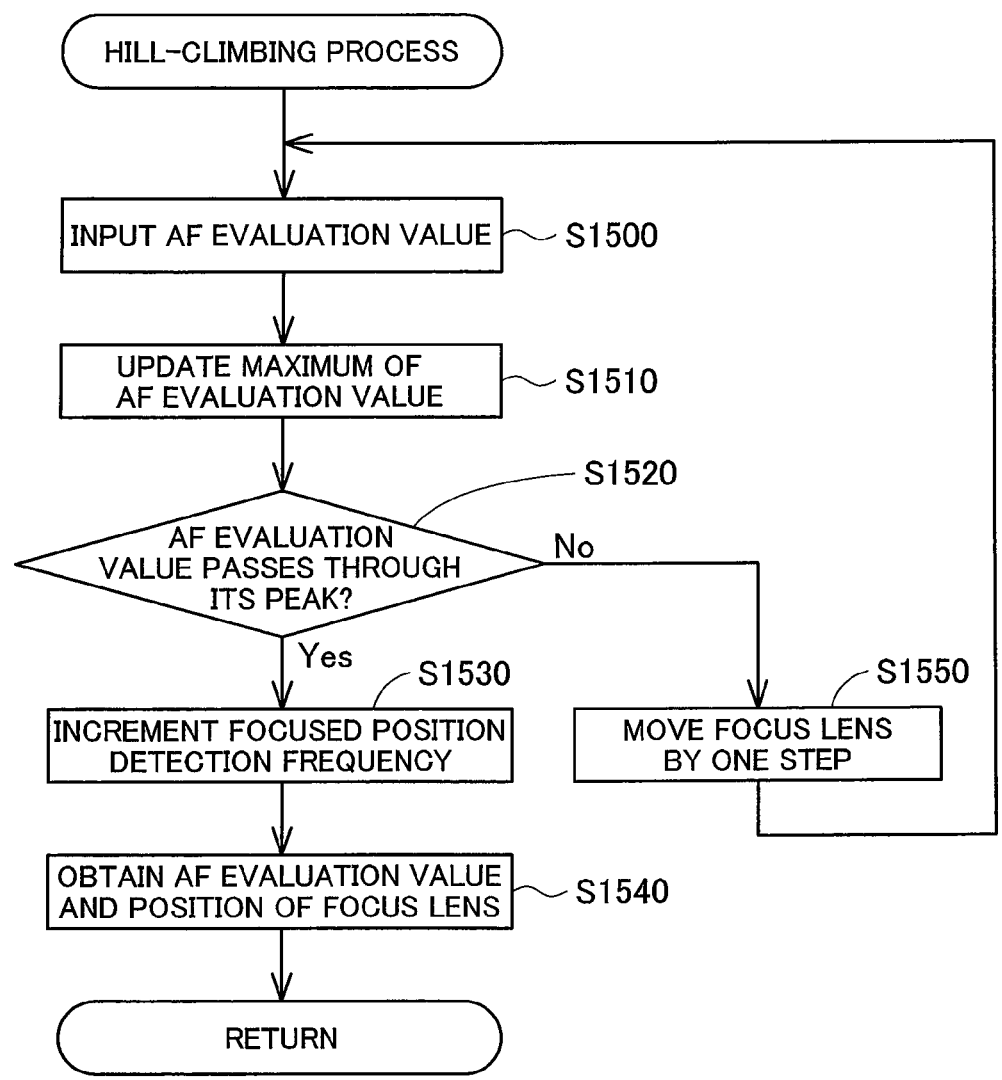
FIG. 7 is a flowchart showing the details of a hill-climbing process.

FIG. 7 is a flowchart showing the details of the hill-climbing process executed at step S1430 in the auto focusing process of FIG. 6. On the start of the hill-climbing process, the microcomputer 400 inputs the AF evaluation value at the current position of the focus lens 150 (step S1500) and updates the maximum of the AF evaluation value when the newly input AF evaluation value is greater than the previously input AF evaluation values (step S1510).

The microcomputer 400 subsequently determines whether the AF evaluation value input at step S1500 passes through its peak (step S1520). The passage through the peak is detected when the AF evaluation value input at step S1500 becomes lower than the maximum value updated at step S1510 for the first time. In response to detection of the passage of the AF evaluation value through its peak (step S1520: yes), it is determined that the current position of the focus lens 150 is the focused position. The microcomputer 400 then increments the focused position detection frequency (step S1530), obtains the position of the focus lens 150 and the AF evaluation value at this moment (step S1540), and exits from the hill-climbing process.

In the case of non-detection of the passage of the AF evaluation value through the peak (step S1520: no), on the other hand, the microcomputer 400 moves the focus lens 150 by one step in the current moving direction (step S1550), and returns the processing flow to step S1500. This series of processing enables detection of the peak of the AF evaluation value with gradually moving the focus lens 150.

(D-2) Predictive Focus Value Estimation Process

Figure 8:
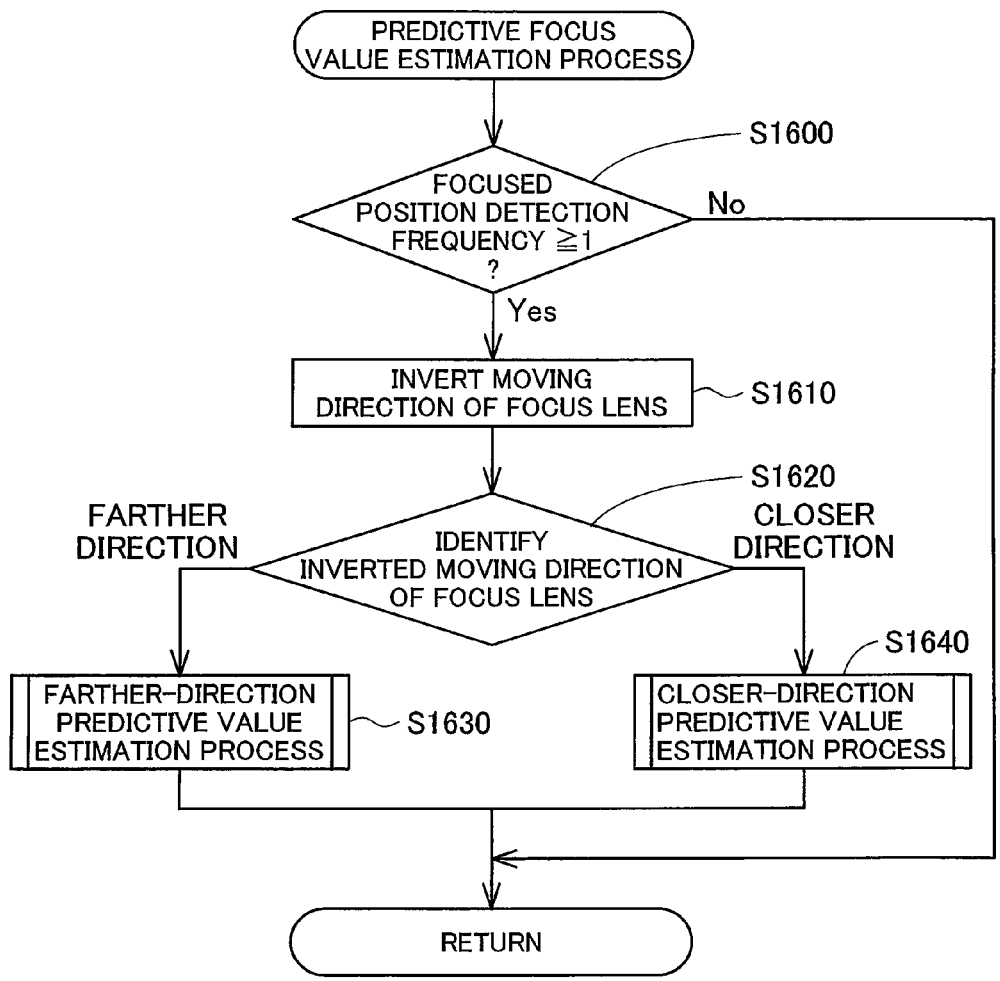
FIG. 8 is a flowchart showing the details of a predictive focus value estimation process.

FIG. 8 is a flowchart showing the details of the predictive focus value estimation process executed at step S1420 in the auto focusing process of FIG. 6. The predictive focus value estimation process estimates the peak value of the AF evaluation value and the position of the focus lens 150 at the peak, which will be detected in the hill-climbing process performed subsequent to the predictive focus value estimation process.

On the start of the predictive focus value estimation process, the microcomputer 400 determines whether the current focused position detection frequency is not less than one time (step S1600). When the current focused position detection frequency is less than one time, that is, equal to 0 (step S1600: no), the hill-climbing process has not yet been performed at all. It is accordingly impossible to obtain the AF evaluation value and the position of the focus lens 150, which are essential for estimation of the predictive values. The microcomputer 400 accordingly exits from the predictive focused state estimation process and shifts to the hill-climbing process described above.

When the current focused position detection frequency is not less than one time (step S1600: yes), on the other hand, the microcomputer 400 inverts the moving direction of the focus lens 150 (step S1610). Such inversion enables the focus lens 150 to be moved in the direction going through the peak value again in the inverted moving direction in a next cycle of the hill-climbing process. One preferable procedure of step S1610 moves the focus lens 150 by a preset number of steps in the original moving direction, prior to inversion of the moving direction of the focus lens 150. This arrangement ensures inversion of the moving direction of the focus lens 150 after the passage of the focus lens 150 through the peak value.

After inversion of the moving direction of the focus lens 150, the microcomputer 400 identifies whether the inverted moving direction of the focus lens 150 is the closer direction or the farther direction (step S1620). When the identified moving direction of the focus lens 150 is the farther direction, a farther-direction predictive value estimation process is performed (step S1630) as described below. When the identified moving direction of the focus lens 150 is the closer direction, on the other hand, a closer-direction predictive value estimation process is performed (step S1640) as described below. On completion of either the farther-direction predictive value estimation process or the closer-direction predictive value estimation process, the microcomputer 400 exits from the predictive focus value estimation process.

Figure 9:
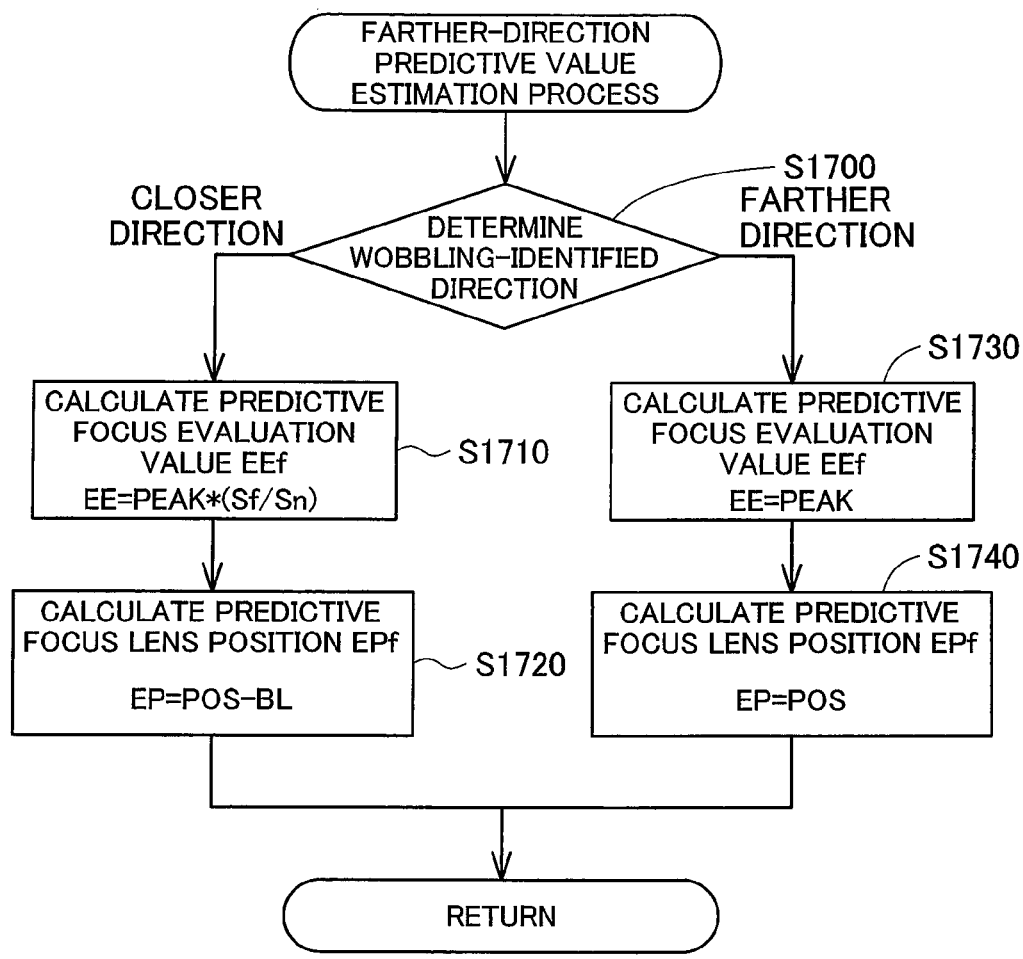
FIG. 9 is a flowchart showing the details of a farther-direction predictive value estimation process.

FIG. 9 is a flowchart showing the details of the farther-direction predictive value estimation process executed at step S1630 in the predictive focus value estimation process of FIG. 8. On the start of the farther-direction predictive value estimation process, the microcomputer 400 first determines whether the hill-climbing direction identified by wobbling the focus lens 150 (hereafter referred to as the 'wobbling-identified direction' at step S1400 in the auto focusing process of FIG. 6 is the closer direction or the farther direction (step S1700).

When it is determined at step S1700 that the wobbling-identified direction is the closer direction, the original hill-climbing direction is opposite to the set moving direction of the focus lens 150. This means that the focus lens 150 is to be inverted from the original moving direction to the set moving direction. In the case of inversion of the focus lens 150, there may be a misalignment of the peak position of the focus lens 150 due to the backlash of the moving mechanism of the focus lens 150 or a change in inclination of the focus lens 150. The microcomputer 400 accordingly calculates a predictive peak value of the AF evaluation value (hereafter referred to as 'predictive focus evaluation value EE) and a predictive value of the position of the focus lens 150 at the peak (hereafter referred to as 'predictive focus lens position EP), which will be detected in a next cycle of the hill-climbing process. EE and EP are calculated from the parameters Sn and Sf written in the flash memory 600 and the backlash correction value BL calculated in the initialization process according to Equations (5) and (6) given below (steps S1710 and S1720):

$$EE = PEAK * (Sf/Sn) \quad (5)$$

$$EP = POS - BL \quad (6)$$

In Equations (5) and (6), 'PEAK' represents the peak value of the AF evaluation value detected in the previous cycle of the hill-climbing process, and 'POS' represents the position of the focus lens 150 at the peak detected in the previous cycle of the hill-climbing process. The predictive focus evaluation value EE is given according to Equation (5) by multiplying the peak value of the AF evaluation value (PEAK) detected in the previous cycle of the hill-climbing process by the ratio of the peak value Sf of the AF evaluation value in moving the focus lens 150 in the farther direction to the peak value Sn of the AF evaluation value in moving the focus lens 150 in the closer direction, which are obtained in the correction value calculation process for factory setting. The predictive focus lens position EP is given according to Equation (6) by subtracting the backlash correction value BL calculated in the initialization process from the position of the focus lens 150 at the peak (POS) detected in the previous cycle of the hill-climbing process. Such computations accurately estimate the peak value of the AF evaluation value and the position of the focus lens 150 at the peak, which will be detected in the next cycle of the hill-climbing process.

When it is determined at step S1700 that the wobbling-identified direction is the farther direction, the original hill-climbing direction is identical with the set moving direction of the focus lens 150. This means that the focus lens 150 is to be moved in the set farther direction that is identical with the original moving direction. There is accordingly no misalignment of the peak position of the focus lens 150 due to the backlash of the moving mechanism of the focus lens 150 or no change in inclination of the focus lens 150. The microcomputer 400 accordingly calculates the predictive focus evaluation value EE and the predictive focus lens position EP according to Equations (7) and (8) given below (steps S1730 and S1740):

$$EE=PEAK \quad (7)$$

$$EP=POS \quad (8)$$

The peak value of the AF evaluation value (PEAK) and the position of the focus lens 150 at the peak (POS) detected in the previous cycle of the hill-climbing process are directly set to the predictive focus evaluation value EE and the predictive focus lens position EP according to Equations (7) and (8). The farther-direction predictive value estimation process is terminated after calculation of the predictive focus evaluation value EE and the predictive focus lens position EP.

Figure 10:
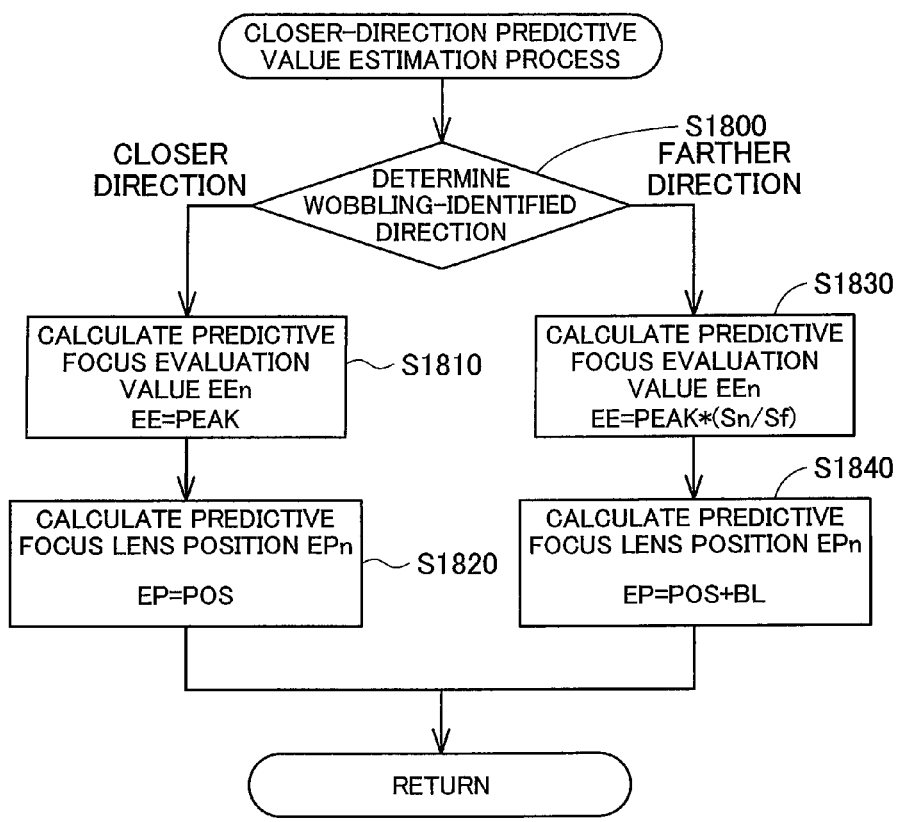
FIG. 10 is a flowchart showing the details of a closer-direction predictive value estimation process.

FIG. 10 is a flowchart showing the details of the closer-direction predictive value estimation process executed at step S1640 in the predictive focus value estimation process of FIG. 8. On the start of the closer-direction predictive value estimation process, the microcomputer 400 first determines whether the wobbling-identified direction is the closer direction or the farther direction (step S1800). When the wobbling-identified direction is the closer direction, the focus lens 150 is to be moved in the set closer direction that is identical with the original moving direction. The microcomputer 400 accordingly calculates the predictive focus evaluation value EE and the predictive focus lens position EP according to Equations (7) and (8) given above (steps S1810 and S1820). As explained above, the peak value of the AF evaluation value (PEAK) and the position of the focus lens 150 at the peak (POS) detected in the previous cycle of the hill-climbing process are directly set to the predictive focus evaluation value EE and the predictive focus lens position EP according to Equations (7) and (8).

When the wobbling-identified direction is the farther direction, the focus lens 150 is to be inverted from the original moving direction to the set moving direction. In the case of inversion of the focus lens 150, there may be a misalignment of the peak position of the focus lens 150 due to the backlash of the moving mechanism of the focus lens 150 or a change in inclination of the focus lens 150. The microcomputer 400 accordingly calculates the predictive focus evaluation value EE and the predictive focus lens position EP according to Equations (9) and (10) given below (steps S1830 and S1840):

$$EE=PEAK*(Sn/Sf) \quad (9)$$

$$EP=POS+BL \quad (10)$$

The closer-direction predictive value estimation process is terminated after calculation of the predictive focus evaluation value EE and the predictive focus lens position EP.

The predictive focus evaluation value EE is given according to Equation (9) by multiplying the peak value of the AF evaluation value (PEAK) detected in the previous cycle of the hill-climbing process by the ratio of the peak value Sn of the AF evaluation value in moving the focus lens 150 in the closer direction to the peak value Sf of the AF evaluation value in moving the focus lens 150 in the farther direction, which are obtained in the correction value calculation process for factory setting. The predictive focus lens position EP is given according to Equation (10) by adding the backlash correction value BL calculated in the initialization process to the position of the focus lens 150 at the peak (POS) detected in the previous cycle of the hill-climbing process. Such computations accurately estimate the peak value of the AF evaluation value and the position of the focus lens 150 at the peak, which will be detected in the next cycle of the hill-climbing process.

(D-3) Focus Value Comparison Process

Figure 11:
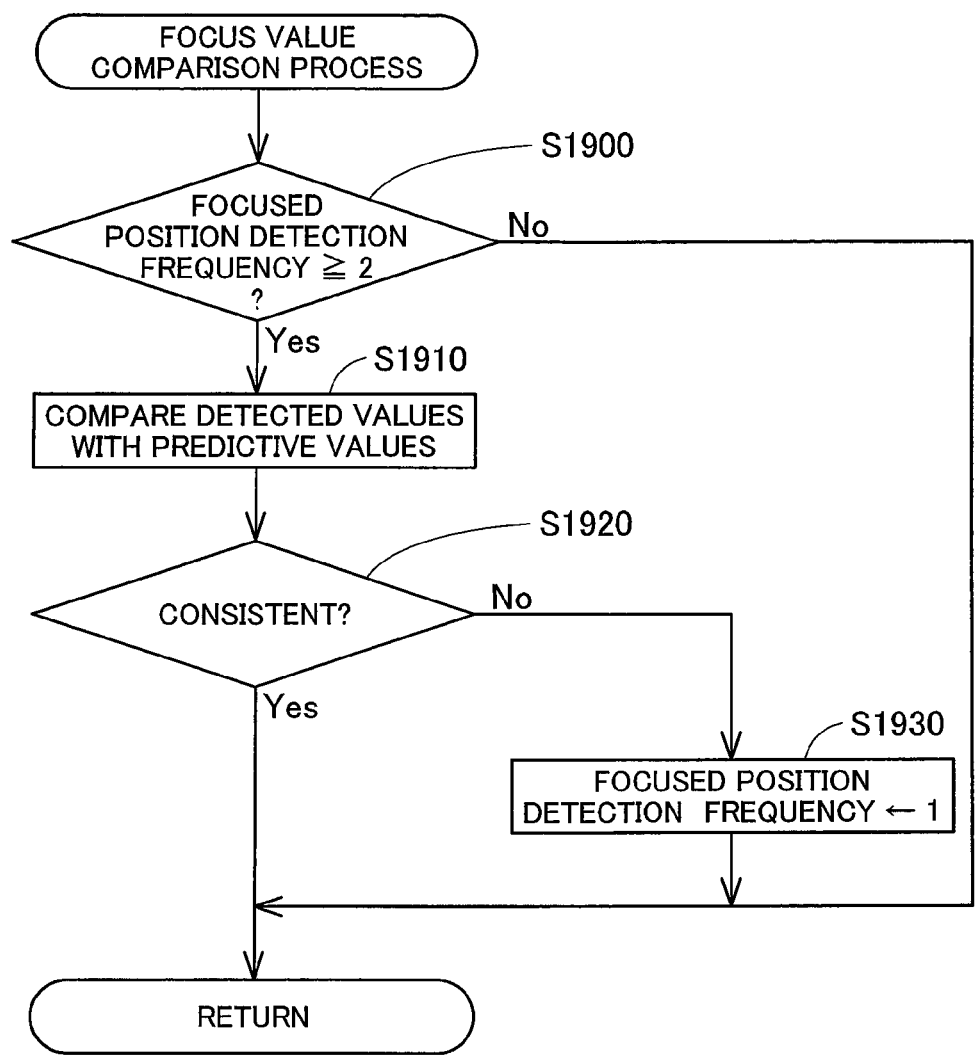
FIG. 11 is a flowchart showing the details of a focus value comparison process.
Figure 12:
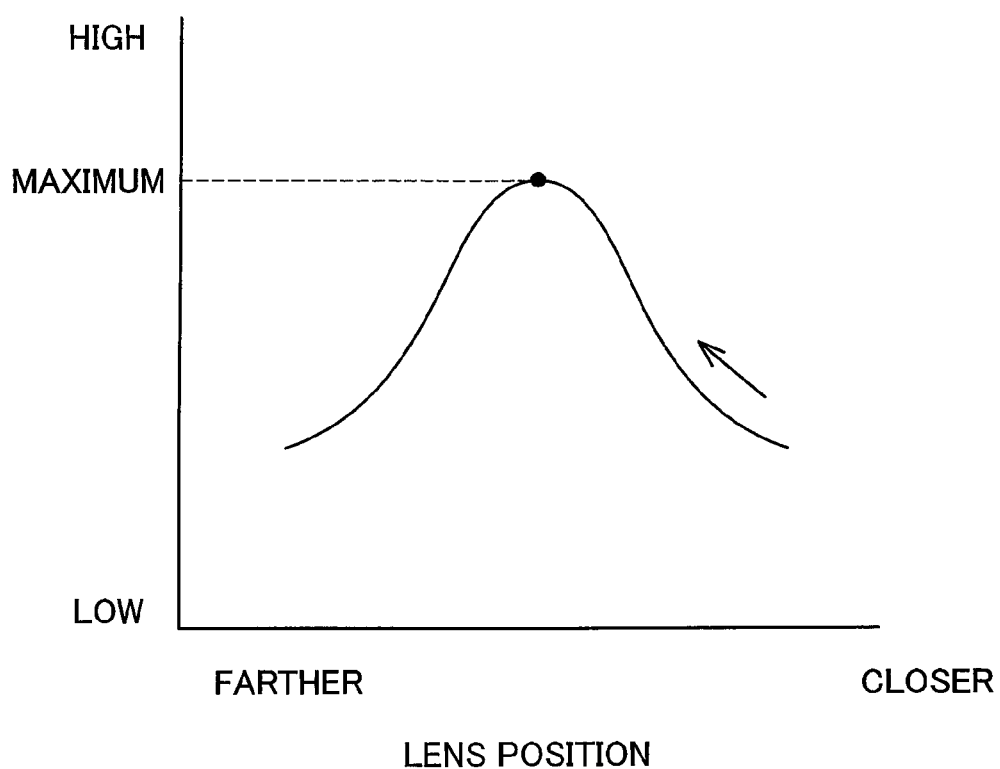
FIG. 12 shows one example of conventional auto focusing control.

FIG. 11 is a flowchart showing the details of the focus value comparison process executed at step S1440 in the auto focusing process of FIG. 6. The focus value comparison process compares the peak value of the AF evaluation value and the position of the focus lens 150 at the peak detected in the hill-climbing process of FIG. 7 with the predictive values calculated in the predictive focus value estimation process of FIGS. 8 to 10.

On the start of the focus value comparison process, the microcomputer 400 first determines whether the current focused position detection frequency is not less than two times (step S1900). The hill-climbing process is always executed prior to this focus value comparison process in the auto focusing process of FIG. 6. The focused position detection frequency is thus one time at the minimum. When the focused position detection frequency is one time, however, the predictive values have not yet been calculated as clearly understood from the auto focusing process of FIG. 6 and the predictive focus value estimation process of FIG. 8. When the focused position detection frequency is less than two times and is equal to one time (step S1900: no), the processing flow immediately terminates the focus value comparison process of FIG. 11 and is returned to the auto focusing process of FIG. 6.

When the focused position detection frequency is not less than two times (step S1900: yes), comparison with the predictive values is allowable. The microcomputer 400 accordingly compares the predictive focus evaluation value EE calculated in the predictive focus value estimation process with the peak value of the AF evaluation value detected in the hill-climbing process, while comparing the predictive focus lens position EP calculated in the predictive focus value estimation process with the position of the focus lens 150 at the peak detected in the hill-climbing process (step S1910). When the comparison shows that the respective differences between the detected values and the corresponding predictive values are not within predetermined ranges, it is determined that the detected values are inconsistent with the predictive values (step S1920: no). The focused position detection frequency is then reset to one time (step S1930). The inconsistency between the detected values (observed values) and the predictive values suggests a positional change of the subject. The focused position detection frequency incremented at step S1540 in the hill-climbing process of FIG. 7 is accordingly reset to '1', and the auto focusing process of FIG. 6 is performed again.

When the comparison of step S1910 shows that the respective differences between the detected values and the corresponding predictive values are within the predetermined ranges, it is determined that the detected values are consistent with the predictive values (step S1920: yes). The processing flow then exits from the focus value comparison process without resetting the focused position detection frequency. The focused position detection frequency is accordingly not changed from the value incremented at step S1540 in the hill-climbing process of FIG. 7. The consistency between the detected values and the predictive values suggests no positional change of the subject.

On completion of the focus value comparison process, the microcomputer 400 returns the processing to the auto focusing process of FIG. 6 and determines whether the focused position detection frequency has reached the predetermined number of times. In response to the increment of the focused position detection frequency to the predetermined number of times, the focused state is expected to be stable. The auto focusing process is terminated after the shift of the focus lens 150 to the lens position at the peak of the AF evaluation value detected in the hill-climbing process.

As described above, the video camera 10 of the embodiment attains auto focusing with correcting a variation in AF evaluation value according to the moving direction of the focus lens 150, as well as the backlash of the focus lens 150 and its moving mechanism. Even in the event of a deviation of the optical axis of the focus lens 150 from its center axis according to the moving direction of the focus lens 150 or in the event of a change in inclination, the technique of the embodiment enables the focused position to be accurately adjusted with sufficient consideration given to the potential mechanical backlash and variation.

In the embodiment described above, the parameters for correcting the potential backlash and variation in the video camera 10 are calculated for factory setting and are stored in the flash memory 600 before shipment of the video camera 10. Even when each individual video camera 10 has a different mechanical backlash of the lens unit 100, the focused position is adjustable based on the parameters intrinsic to the video camera 10.

In the embodiment described above, the parameters for correcting the potential backlash in the video camera 10 are calculated in the initialization process of the video camera 10, as well as in the factory setting prior to the shipment. The final backlash correction value is obtained according to the parameters calculated for factory setting and the parameters calculated in the initialization process. The focused position is adjustable with consideration given to even a potential backlash with aging. This arrangement desirably attains highly accurate auto focusing.

In the embodiment described above, the parameters for correcting the potential backlash in the video camera 10 are computed in advance in the initialization process. There is accordingly no need of calculating any correction value in the auto focusing process. This arrangement desirably shortens the time required for auto focusing.

The embodiment discussed above is to be considered in all aspects as illustrative and not restrictive. There may be many modifications, changes, and alterations without departing from the scope or spirit of the main characteristics of the present invention. For example, while the embodiment regards the auto focusing operation of the video camera 10, the control technique of the embodiment is also applicable to the auto focusing operation of a still camera.

The procedure of the embodiment corrects the AF evaluation value and the backlash in the course of estimating the predictive values in the predictive focus value estimation process. One possible modification may correct the observed AF evaluation value, instead of correcting the AF evaluation value in the course of estimating the predictive values. The predictive focus value estimation process in this modification sets the peak value of the AF evaluation value and the position of the focus lens 150 at the peak detected in the previous cycle of the hill-climbing process to the predictive values, regardless of the moving direction of the focus lens 150. Instead the peak value of the AF evaluation value and the position of the focus lens 150 at the peak actually detected in the hill-climbing process are corrected according to the moving direction of the focus lens 150. This modified control procedure enables accurate adjustment of the focused position, like the control procedure of the embodiment.

E. Other Aspects

The invention may be embodied in the following aspects. For example, in one preferable application of the focus adjustment device, the correction value calculation unit calculates a focused-position correction value for correcting the focused position, based on a difference between a position of the lens at the peak value of the evaluation value detected in the forward motion of the lens and a position of the lens at the peak value of the evaluation value detected in the backward motion of the lens. The focused position detection unit corrects a current position of the lens with the calculated focused-position correction value according to the moving direction of the lens, and detects the focused position of the lens based on the corrected position of the lens and the corrected evaluation value.

The focus adjustment device of this application corrects both the evaluation value and the position of the lens according to the moving direction of the lens and detects the focused position of the lens based on the corrected evaluation value and the corrected position of the lens. This arrangement effectively enables the lens to be accurately focused on the subject.

In one preferable embodiment, the focus adjustment device according to one aspect of the invention further comprising: an origin detection unit that detects that the lens reaches a preset reference position as a position of an origin; an origin correction value calculation unit that moves the lens forward and backward and calculates an origin-position correction value for correcting the position of the origin, based on a difference between a detected position of the origin in the forward motion of the lens and a detected position of the origin in the backward motion of the lens; and a reflection unit that controls the origin-position correction value calculator to calculate the origin-position correction value in factory setting before shipment of the focus adjustment device and on a power-on time after the shipment of the focus adjustment device, and makes a variation in origin-position correction value reflected on the focused-position correction value.

The focus adjustment device of this embodiment desirably causes a positional change of the origin of the lens with aging after the shipment to be reflected on detection of the focused position of the lens. This arrangement thus enables the lens to be focused on the subject with the higher accuracy.

In another preferable application of the focus adjustment device, the focused position detection unit tentatively detects a peak value of the evaluation value, moves the lens forward and backward about the tentatively detected peak value, and, when a detection frequency of a non-varied peak value reaches a predetermined number of times, specifies a position of the lens at the non-varied peak value to the focused position of the lens.

In the focus adjustment device of this application, the focused position of the lens is detected when the detection frequency of the non-varied peak value has reached the predetermined number of times. This arrangement effectively prevents the focusing operation in an unstable focused state with a positional change or an appearance change of the subject. The lens can thus be focused on the subject with the higher accuracy.

In one preferable structure of the focus adjustment device of this application, the focused position detection unit estimates a predictive peak value of the evaluation value at a focused position of the lens detected in a subsequent motion of the lens in a subsequent moving direction, based on a peak value of the evaluation value at a focused position of the lens detected in a previous motion of the lens in a previous moving direction and on the calculated evaluation correction value, and detects no variation of the peak value when an actual peak value of the evaluation value detected in the subsequent motion of the lens in the subsequent moving direction is consistent with the estimated predictive peak value.

In the focus adjustment device of this structure, the predictive peak value of the evaluation value detected in the subsequent motion of the lens in the subsequent moving direction is estimated, based on the peak value of the evaluation value detected in the previous motion of the lens in the previous moving direction and the calculated evaluation correction value. It is then determined whether the lens is focused, based on the estimated predictive peak value of the evaluation value. This arrangement enables accurate detection of the focused position of the lens.

What is claimed is:

1. A focus adjustment device that moves a lens in a direction of an optical axis to adjust a focus of the lens, the focus adjustment device comprising:
   an evaluation unit configured to analyze an image captured via the lens and specify an evaluation value representing a focused state of the lens;
   a correction value calculation unit configured to capture an image of a specific subject with moving the lens forward and backward, and calculate an evaluation correction value for correcting the evaluation value, based on a difference between a first peak value of the evaluation value detected in a forward motion of the lens and a second peak value of the evaluation value detected in a backward motion of the lens, prior to moving the lens for adjustment of the focus;
   a focused position detection unit configured to correct the evaluation value with the calculated evaluation correction value according to a moving direction of the lens, and detect a focused position of the lens, based on the corrected evaluation value in moving the lens for adjustment of the focus; and
   a focusing control unit configured to move the lens to the detected focused position.

2. The focus adjustment device in accordance with claim 1, wherein the correction value calculation unit calculates a focused-position correction value for correcting the focused position, based on a difference between a position of the lens at the peak value of the evaluation value detected in the forward motion of the lens and a position of the lens at the peak value of the evaluation value detected in the backward motion of the lens, and
   the focused position detection unit corrects a current position of the lens with the calculated focused-position correction value according to the moving direction of the lens, and detects the focused position of the lens based on the corrected position of the lens and the corrected evaluation value.

3. The focus adjustment device in accordance with claim 1, wherein the focused position detection unit detects a peak value of the evaluation value, moves the lens forward and backward about the detected peak value, and, when a detection frequency of a non-varied peak value reaches a predetermined number of times, specifies a position of the lens at the non-varied peak value to the focused position of the lens.

4. The focus adjustment device in accordance with claim 1, wherein the evaluation unit specifies the evaluation value, based on a high frequency component of the captured image.

5. The focus adjustment device in accordance with claim 1, wherein the correction value calculation unit moves the lens from an end in a farther direction to a closer direction in a movable range of the lens to detect the first peak value, and moves the lens from an end in the closer direction to the farther direction in the movable range of the lens to detect the second peak value.

6. A focus adjustment device that moves a lens in a direction of an optical axis to adjust a focus of the lens, the focus adjustment device comprising:
   an evaluation unit configured to analyze an image captured via the lens and specify an evaluation value representing a focused state of the lens;
   a correction value calculation unit configured to capture an image of a specific subject with moving the lens forward and backward, and calculate an evaluation correction value for correcting the evaluation value, based on a difference between a peak value of the evaluation value detected in a forward motion of the lens and a peak value of the evaluation value detected in a backward motion of the lens, prior to moving the lens for adjustment of the focus;
   a focused position detection unit configured to correct the evaluation value with the calculated evaluation correction value according to a moving direction of the lens, and detect a focused position of the lens, based on the corrected evaluation value in moving the lens for adjustment of the focus; and
   a focusing control unit configured to move the lens to the detected focused position;
   wherein the correction value calculation unit calculates a focused-position correction value for correcting the focused position, based on a difference between a position of the lens at the peak value of the evaluation value detected in the forward motion of the lens and a position of the lens at the peak value of the evaluation value detected in the backward motion of the lens, and
   the focused position detection unit corrects a current position of the lens with the calculated focused-position correction value according to the moving direction of the lens, and detects the focused position of the lens based on the corrected position of the lens and the corrected evaluation value;
   the focus adjustment device further comprising:
   an origin detection unit configured to detect that the lens reaches a preset reference position as a position of an origin;
   an origin correction value calculation unit configured to move the lens forward and backward and calculate an origin-position correction value for correcting the position of the origin, based on a difference between a detected position of the origin in the forward motion of the lens and a detected position of the origin in the backward motion of the lens; and
   a reflection unit configured to control the origin correction value calculation unit to calculate the origin-position correction value in factory setting before shipment of the focus adjustment device and on a power-on time after the shipment of the focus adjustment device, and make a variation in origin-position correction value reflected on the focused-position correction value.

7. A focus adjustment device that moves a lens in a direction of an optical axis to adjust a focus of the lens, the focus adjustment device comprising:
   an evaluation unit configured to analyze an image captured via the lens and specify an evaluation value representing a focused state of the lens;
   a correction value calculation unit configured to capture an image of a specific subject with moving the lens forward and backward, and calculate an evaluation correction value for correcting the evaluation value, based on a difference between a peak value of the evaluation value detected in a forward motion of the lens and a peak value of the evaluation value detected in a backward motion of the lens, prior to moving the lens for adjustment of the focus;

a focused position detection unit configured to correct the evaluation value with the calculated evaluation correction value according to a moving direction of the lens, and detect a focused position of the lens, based on the corrected evaluation value in moving the lens for adjustment of the focus; and a focusing control unit configured to move the lens to the detected focused position;

wherein the focused position detection unit detects a peak value of the evaluation value, moves the lens forward and backward about the detected peak value, and, when a detection frequency of a non-varied peak value reaches a predetermined number of times, specifies a position of the lens at the non-varied peak value to the focused position of the lens;

wherein the focused position detection unit estimates a predictive peak value of the evaluation value at a focused position of the lens detected in a subsequent motion of the lens in a subsequent moving direction, based on a peak value of the evaluation value at a focused position of the lens detected in a previous motion of the lens in a previous moving direction and on the calculated evaluation correction value, and detects no variation of the peak value when an actual peak value of the evaluation value detected in the subsequent motion of the lens in the subsequent moving direction is consistent with the estimated predictive peak value.

8. An imaging device that moves a lens in a direction of an optical axis to adjust a focus of the lens, the imaging device comprising:

an evaluation unit configured to analyze an image captured via the lens and specify an evaluation value representing a focused state of the lens;

a correction value calculation unit configured to capture an image of a specific subject with moving the lens forward and backward, and calculate an evaluation correction value for correcting the evaluation value, based on a difference between a first peak value of the evaluation value detected in a forward motion of the lens and a second peak value of the evaluation value detected in a backward motion of the lens, prior to moving the lens for adjustment of the focus;

a focused position detection unit configured to correct the evaluation value with the calculated evaluation correction value according to a moving direction of the lens, and detect a focused position of the lens, based on the corrected evaluation value in moving the lens for adjustment of the focus;

a focusing control unit configured to move the lens to the detected focused position; and an imaging unit configured to capture the image via the focused lens.

9. The imaging device in accordance with claim 8, wherein the correction value calculation unit moves the lens from an end in a farther direction to a closer direction in a movable range of the lens to detect the first peak value, and moves the lens from an end in the closer direction to the farther direction in the movable range of the lens to detect the second peak value.

10. The imaging device in accordance with claim 8, wherein the correction value calculation unit calculates a focused-position correction value for correcting the focused position, based on a difference between a position of the lens at the peak value of the evaluation value detected in the forward motion of the lens and a position of the lens at the peak value of the evaluation value detected in the backward motion of the lens, and the focused position detection unit corrects a current position of the lens with the calculated focused-position correction value according to the moving direction of the lens, and detects the focused position of the lens based on the corrected position of the lens and the corrected evaluation value, the focus adjustment device further comprising:

an origin detection unit configured to detect that the lens reaches a preset reference position as a position of an origin;

an origin correction value calculation unit configured to move the lens forward and backward and calculate an origin-position correction value for correcting the position of the origin, based on a difference between a detected position of the origin in the forward motion of the lens and a detected position of the origin in the backward motion of the lens; and a reflection unit configured to control the origin correction value calculation unit to calculate the origin-position correction value in factory setting before shipment of the focus adjustment device and on a power-on time after the shipment of the focus adjustment device, and make a variation in origin-position correction value reflected on the focused-position correction value.

11. The imaging device in accordance with claim 8, wherein the focused position detection unit detects a peak value of the evaluation value, moves the lens forward and backward about the detected peak value, and, when a detection frequency of a non-varied peak value reaches a predetermined number of times, specifies a position of the lens at the non-varied peak value to the focused position of the lens; and wherein the focused position detection unit estimates a predictive peak value of the evaluation value at a focused position of the lens detected in a subsequent motion of the lens in a subsequent moving direction, based on a peak value of the evaluation value at a focused position of the lens detected in a previous motion of the lens in a previous moving direction and on the calculated evaluation correction value, and detects no variation of the peak value when an actual peak value of the evaluation value detected in the subsequent motion of the lens in the subsequent moving direction is consistent with the estimated predictive peak value.

12. A focus adjustment method that moves a lens in a direction of an optical axis to adjust a focus of the lens, the focus adjustment method comprising:

analyzing an image captured via the lens and specifying an evaluation value representing a focused state of the lens;

capturing an image of a specific subject with moving the lens forward and backward, and calculating an evaluation correction value for correcting the evaluation value, based on a difference between a first peak value of the evaluation value detected in a forward motion of the lens and a second peak value of the evaluation value detected in a backward motion of the lens, prior to moving the lens for adjustment of the focus;

correcting the evaluation value with the calculated evaluation correction value according to a moving direction of the lens, and detecting a focused position of the lens, based on the corrected evaluation value in moving the lens for adjustment of the focus; and moving the lens to the detected focused position.

13. The focus adjustment method in accordance with claim 12, wherein the correction value calculation unit moves the lens from an end in a farther direction to a closer direction in a movable range of the lens to detect the first peak value, and moves the lens from an end in the closer direction to the farther direction in the movable range of the lens to detect the second peak value.

14. The focus adjustment method in accordance with claim 12, wherein the correction value calculation unit calculates a focused-position correction value for correcting the focused position, based on a difference between a position of the lens at the peak value of the evaluation value detected in the forward motion of the lens and a position of the lens at the peak value of the evaluation value detected in the backward motion of the lens, and the focused position detection unit corrects a current position of the lens with the calculated focused-position correction value according to the moving direction of the lens, and detects the focused position of the lens based on the corrected position of the lens and the corrected evaluation value, the focus adjustment device further comprising:

an origin detection unit configured to detect that the lens reaches a preset reference position as a position of an origin;

an origin correction value calculation unit configured to move the lens forward and backward and calculate an origin-position correction value for correcting the position of the origin, based on a difference between a detected position of the origin in the forward motion of the lens and a detected position of the origin in the backward motion of the lens; and a reflection unit configured to control the origin correction value calculation unit to calculate the origin-position correction value in factory setting before shipment of the focus adjustment device and on a power-on time after the shipment of the focus adjustment device, and make a variation in origin-position correction value reflected on the focused-position correction value.

15. The focus adjustment method in accordance with claim 12, wherein the focused position detection unit detects a peak value of the evaluation value, moves the lens forward and backward about the detected peak value, and, when a detection frequency of a non-varied peak value reaches a predetermined number of times, specifies a position of the lens at the non-varied peak value to the focused position of the lens; and wherein the focused position detection unit estimates a predictive peak value of the evaluation value at a focused position of the lens detected in a subsequent motion of the lens in a subsequent moving direction, based on a peak value of the evaluation value at a focused position of the lens detected in a previous motion of the lens in a previous moving direction and on the calculated evaluation correction value, and detects no variation of the peak value when an actual peak value of the evaluation value detected in the subsequent motion of the lens in the subsequent moving direction is consistent with the estimated predictive peak value.

* * * * *